United States Patent [19]

Lamb

[11] Patent Number: 4,983,294
[45] Date of Patent: Jan. 8, 1991

[54] SEPARATOR
[75] Inventor: Timothy J. Lamb, Clevedon, United Kingdom
[73] Assignee: Hydro International Limited, United Kingdom
[21] Appl. No.: 418,152
[22] Filed: Oct. 6, 1989
[30] Foreign Application Priority Data
    Oct. 7, 1988 [GB] United Kingdom ............... 8823631
[51] Int. Cl.$^5$ ............................................. B01D 17/25
[52] U.S. Cl. ................................. 210/521; 210/522; 210/532.1
[58] Field of Search ............... 210/519, 521, 522, 525, 210/532.1

[56]        References Cited
         U.S. PATENT DOCUMENTS
    2,790,554  4/1957  Work ........................... 210/294
    4,519,907  5/1985  Rooney ....................... 210/257.1
    4,747,962  5/1988  Smisson ...................... 210/788

FOREIGN PATENT DOCUMENTS
    2152401  8/1985  United Kingdom .

Primary Examiner—Charles Hart
Attorney, Agent, or Firm—Larson and Taylor

[57] ABSTRACT

There is disclosed a low energy separator of the type comprising a vessel (1) in which rotational movement of liquid in the vessel is sufficient to cause or enhance an inward sweeping effect towards an annular opening in the base (3) of the vessel on solids accumulated at the base of the vessel (1) while being of sufficiently low energy that separation of the solids components in the liquid in the vessel (1) is brought about primarily by gravity. In order to reduce turbulence caused by the outlet (7) in the upper region of the vessel (1), a flow modifying means (14) is provided which guides liquid circulating in the vessel (1) at an upper region thereof to a level at or below the lower level of the outlet (7).

12 Claims, 2 Drawing Sheets

SEPARATOR

This invention relates to a separator capable of operating at low energy for separating solid components out of a liquid mixture and is more particularly concerned with improvements which enable the clean liquid outlet of the separator to be disposed in the normal annular path of a circulating liquid mixture within the separator.

Our British Patent No. 2082941 discloses a separator which is particularly suitable for separating, for example, sewage and other solid matter from water in storm water overflows. The separator is in the form of a cylindrical vessel having an inlet which is disposed tangentially so as to promote a circulating flow within the vessel. This circulating flow comprises an outer, relatively fast, flow and an inner, relatively slow, flow. The shear zone between these two regions is stabilised by an annular dip plate which projects downwardly from the top of the vessel. A flow-modifying member is provided in the vessel to enhance the removal of solid particles accumulating at the bottom of the vessel to a central outlet. Clean water is removed from the top of the vessel. In the embodiments shown in our British Patent No. 2082941 the vessel is closed at its upper end by a lid and the liquid at the top of the vessel is caused to flow between a horizontal baffle plate and the lid to a chamber at the top of the vessel. In the annular space between the lid of the vessel and the baffle there are plates which spoil the flow of the clean water flowing to the outlet. This arrangement has the disadvantage that energy is dissipated in destroying the circulating flow of liquid in the vessel, but is necessary if the clean liquid is to be collected in a central chamber prior to being discharged.

GB- No. 2152401 relates to a clarifier for removing particulate matter from a liquid. The vessel has a cylindrical member projecting through a sloping roof to the vessel. The top of the cylindrical member defines a weir over which clarified liquid flows before passing to an outlet.

According to the present invention there is provided a separator for operation at low energy for separating solid components out of a liquid mixture, comprising a vessel having a cylindrical outer wall and a base at one end, the vessel being provided with (a) a body which defines with the base an annular opening which is spaced from the outer wall (b) an inlet, for introducing a liquid containing the solid components into the vessel, (c) means for promoting a rotational movement of liquid and suspended solids within the vessel, and (d) an outlet duct by which the liquid from which solids have been separated is removed from a central region of the vessel, wherein said outlet duct is positioned at an upper region of the vessel across the normal, direct annular path of circulating liquid in the vessel, wherein a flow modifying means is provided adjacent the outlet duct whereby circulating liquid in the vessel is caused to flow around said duct, away from its normal annular path, in a manner to reduce turbulence, and wherein said rotational movement promoted within the vessel is sufficient to cause or enhance an inward sweeping effect toward the annular opening on solids accumulated at the base of the vessel, whilst being of a sufficiently low energy that separation of the solids components in the liquid in the vessel is brought about primarily by gravity.

The arrangement of the present invention is particularly suitable for separators without a lid enclosing the liquid in the vessel.

The outlet duct may extend from a central cylindrical region of the vessel defined inward of an annular dip plate which is itself spaced inwardly of the outer wall of the separator. The duct may be an enclosed pipe or, alternatively, may be an open gully in the form of a spout leading from a slot in the dip plate.

The outlet may be horizontal and should not extend in a radial direction but, rather, be generally tangential in order to preserve the energy of fluid circulating in the vessel as it flows out through the outlet. The duct may comprise two walls, one of which extends from the dip plate in a direction which is a true tangent to the dip plate.

The flow modifying means may comprise a deflector plate which extends radially between the outer surface of the annular dip plate and the inside of the outer wall of the vessel. This deflector plate guides liquid circulating in the upper region of the vessel to a lower level without causing turbulence. Because of the position of the outlet duct, across the normal circulating path of the liquid mixture in the vessel, it is preferred that the curved deflector plate brings the liquid which would otherwise have flowed directly into a side of the outlet duct to a level at, or immediately below, the lowest level of the outlet duct. This may be achieved by providing a curved, smooth surface such as, in one embodiment, one half of a venturi. Such a shape reduces turbulence to a minimum.

The means for promoting a rotational movement of liquid and suspended solids within the vessel may be the inlet into the vessel by which the liquid mixture is introduced into the vessel. In such a case, the inlet is tangential and the energy of the liquid mixture being introduced into the vessel is sufficient to initiate and sustain the rotational movement in the vessel. Alternatively, or in addition, a further inlet may be provided by which an energising liquid is introduced into the vessel to promote swirl (see our. British Patent No. 2158741).

It is within the scope of the present invention that the outlet duct itself is shaped in such a way as to include the flow modifying means.

It is also within the scope of the present invention to provide a flow modifying means downstream of the outlet duct to bring the flow of liquid in the vessel to its normal level smoothly and without creating undue turbulence.

For a better understanding of the present invention and to show how the same may be carried into effect, reference will now be made, by way of example, to the accompanying drawings in which.

Figure 1:
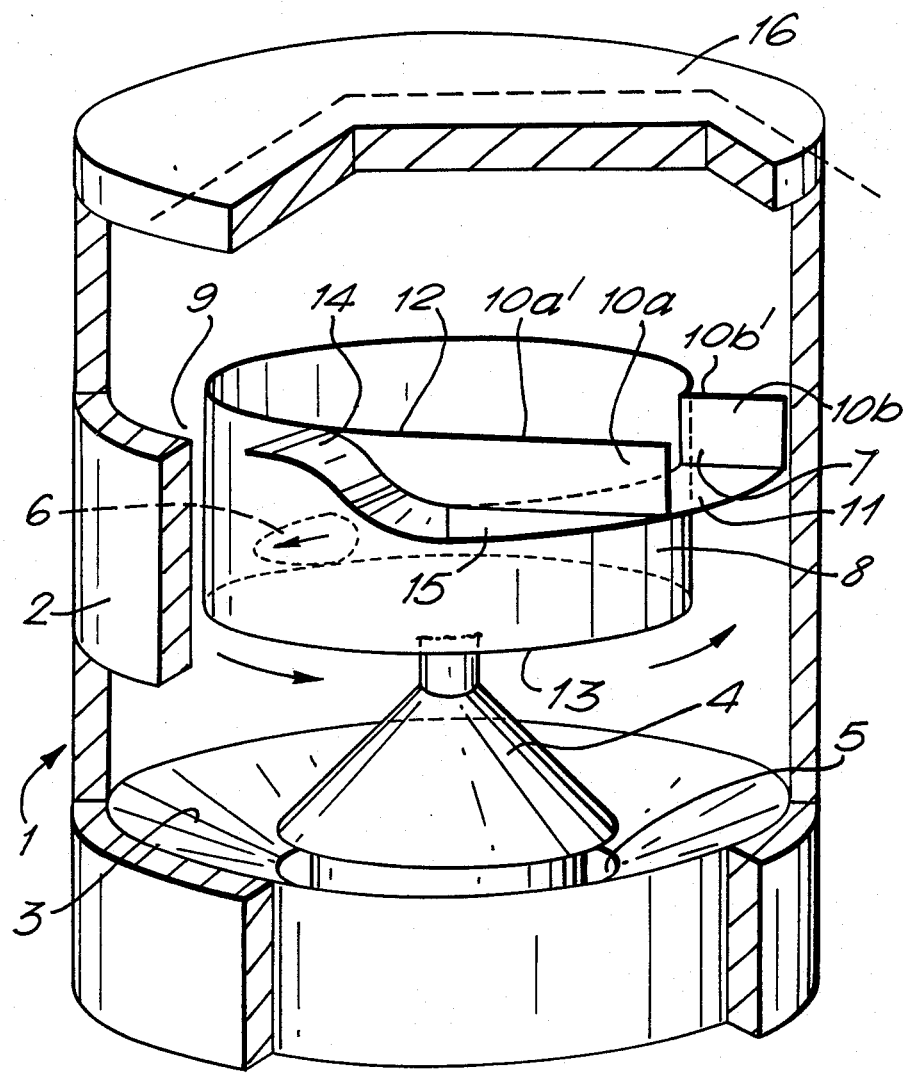
FIG. 1 is a general perspective view of a separator in accordance with the present invention, part of the outer wall of which has been cut away to reveal the internal workings of the separator.
Figure 2:
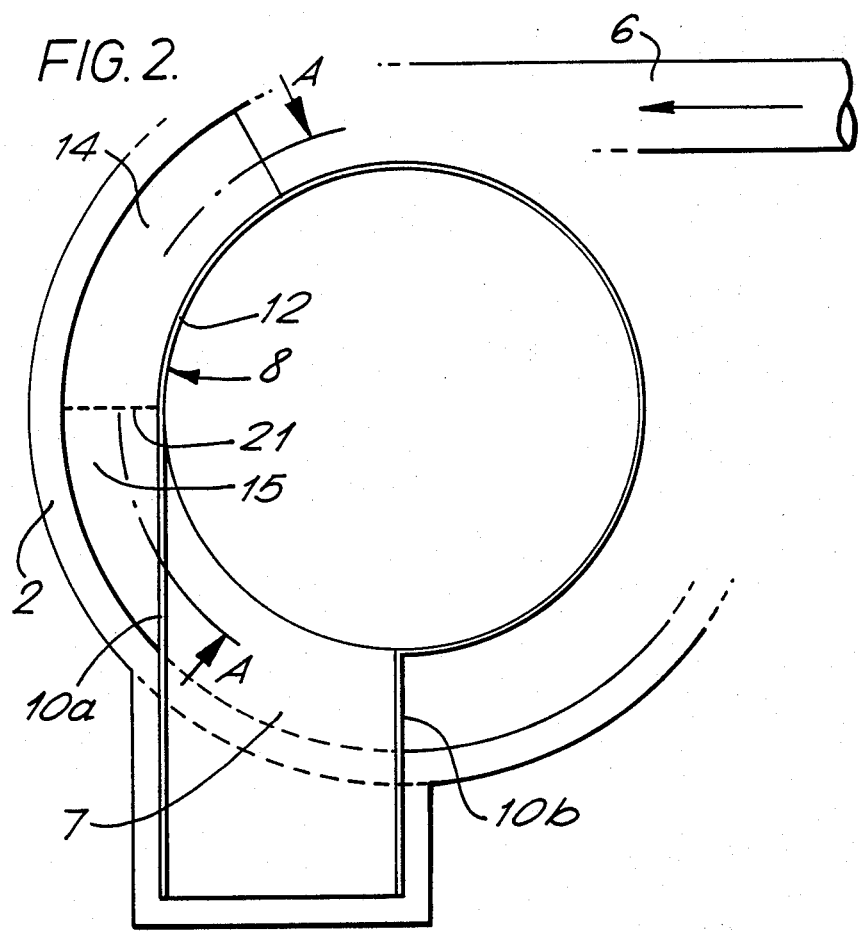
FIG. 2 is a schematic, plan view of the separator of FIG. 1.

The separator shown in FIGS. 1 and 2 comprises a vessel 1 having a cylindrical outer wall 2 and a sloping, conical base 3. The separator may be buried in which case the vessel 1 may be closed by a lid 16 which, typically, will be level with the surface of the ground above the separator. The lid 16 may include access apertures (not shown) via which access to the internal workings of the separator may be gained. Within the vessel 1 there is provided a flow modifying member 4 in the shape of a cone which defines with the base 3 an annular opening 5 which is spaced from the outer wall 2 of the vessel. A tangential inlet 6 (indicated by dotted lines) to the vessel 1 through the outer wall 2 is provided by which a liquid containing solid components may be introduced into the vessel 1. There is also provided a tangential outlet duct 7 and an annular dip plate 8 which is concentric with the outer wall 2 and spaced from the outer wall 2 defining an annular slot 9. The dip plate 8 is supported by horizontal beams (not shown). The outlet duct 7 is formed as a spout in the dip plate 8. The outlet duct 7 has side walls 10a and 10b and a base 11 and extends through the outer wall 2 of the vessel 1 at an upper region thereof The upper edges 10a', 10b' of the sides 10a and 10b of the outlet duct 7 are at the same level as the top of the dip plate 8 whilst the base 11 of the outlet duct is at a height approximately one third of the way down the dip plate 8. The dip plate 8 has an upper edge 12 which is broken by the outlet duct 7 side walls 10a, 10b, and a lower annular edge 13 which is continuous.

In the annular slot 9 between the outer wall 2 and the dip plate 8 there is provided a curved flow modifying plate 14 which extends radially across the annular slot 9 and leads from a level at approximately the upper edge 12 of the dip plate 12 to a level approximately at the base 11 of the outlet duct 7. The curved portion 14 reaches the level of the bottom 11 of the outlet duct 7 slightly upstream of the outlet duct 7. In the short length between the outlet duct 7 and the position at which the curved plate 14 terminates there is provided a flat plate 15 which is in approximately the same plane as the base 11 of the outlet duct 7.

Figure 3:
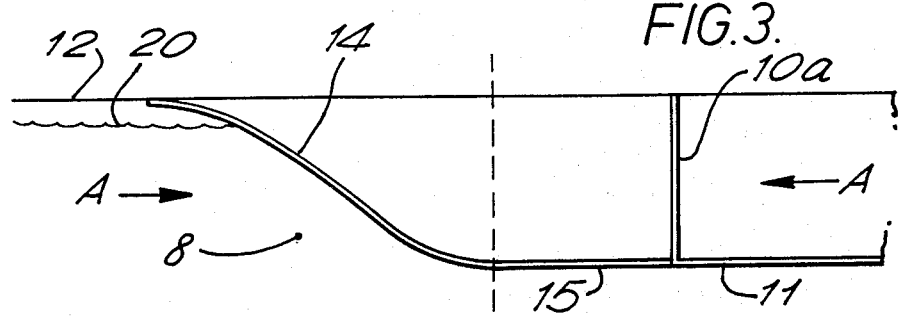
FIG. 3 is a section on the circumferential line A—A of FIG. 2.

FIGS. 2 and 3 show, in more detail, the arrangement of the flow modifying plate 14 in the vessel and the operation of the separator will be described, in more detail, with reference to FIGS. 2 and 3, as well as FIG. 1.

Under normal operating conditions, collected water, for instance rain water from road run-off enters the vessel 1 through the inlet 6. Normally, the rate at which liquid enters the vessel will be relatively slow and the separator will act almost as a clarifying vessel in which material heavier than the water entering sinks to the base 3 of the vessel 1, whilst clean water will slowly spill into the outlet duct 7 and will be carried away. The liquid in the vessel 1 will be circulating only very slowly, if at all.

Under storm conditions, however, in which large amounts of sediment, detritus and other solid matter is carried in the water run-off, the liquid entering the vessel 1 through the tangential inlet 6 will be travelling at a much higher velocity because of the high pressure head from liquid backed-up in the drainage system. Under these conditions, the vessel 1 will quickly fill and the liquid mixture being tangentially introduced into the vessel 1 via the inlet 6 will circulate in the direction shown by the arrows in the vessel (FIG. 1). As described in our British Patent Specification No. 2082941, this circulating flow within the vessel is sufficient to cause an inward sweeping effect toward the annular opening 5 in the base of solids accumulated at the base of the vessel. However, the energy of the circulating fluid is not so large that centrifugal forces have any substantial effect on the particles of solid matter rotating in the vessel 1. The accumulated matter at the base may be removed via a central outlet (not shown). The flow modifying member 4 assists in creating a secondary, toroidal flow in the vessel whilst the annular dip plate 8 stabilises a shear zone between an outer, relatively fast flow and an inner, relatively slow flow of liquid in the vessel 1.

Under storm conditions, the upper level of liquid in the vessel 1 will be close to the top of the annular dip plate 8, probably around the level shown in FIG. 3 by the line 20.

As will be appreciated, the circulating flow of liquid in the vessel 1 is crucially important to the separating characteristics of the separator and any unwanted turbulence may adversely affect the performance of the separator. Thus, the outlet duct 7 of the separator poses a problem in that, in the arrangement of the separators shown in FIGS. 1 to 3, it is in the normal circulating flow path of the liquid mixture in the vessel 1. Accordingly, the present invention provides a flow modifying plate 14 which directs liquid flowing in the vessel 1 smoothly around the outlet duct 7. The radius of curvature of the plate 14 increases steadily to a maximum about half-way along its length and then decreases to zero where the plate 14 meets the flat plate 15. The flow modifying plate 14 has the shape of one half of a venturi, which shape is mathematically determined to cause a minimum of turbulence in flowing liquid. Because of the annular nature of the slot 9, it is necessary to bring the circulating water in the vessel to a level at or below the level of the base 11 of the outlet 7 slightly upstream of the side wall 10a of the outlet duct 7. Thus, as shown in FIG. 2, the curved flow modifying plate 14 terminates at the dotted line 21 at which point it joins the flat plate 15 which is coplanar with the base 11 of the outlet duct 7.

It is to be appreciated that any shape of flow modifying plate is suitable which causes liquid rotating in the vessel to be directed to a level at or below the level of the base 11 of the outlet 7 without causing excessive turbulence. To this end, sharp edges are to be discouraged and rounded edges are provided on the outlet duct 7 and the flow modifying means 14,15 so as to smooth flow in the vessel 1.

Moreover, in order further to decrease turbulence, a flow modifying plate may be placed downstream of the outlet duct 7 whereby liquid flowing in the vessel 1 may be brought back to the normal level of liquid in the vessel smoothly. The flow modifying plate on the downstream side of the outlet duct 7 may have a shape which is a mirror image of the flow modifying plate 14 and the plate 15 on the upstream side of the duct 7.

The separator of the present invention may be a separator in accordance with our British Patent No. 2158741 in which there is provided a further inlet by which a "energising fluid" may be introduced into the vessel in a manner to cause or enhance rotational movement of the liquid in the vessel.

The vessel shown in FIG. 1 has a base region which is in accordance with our British Patent No. 2189413. However, the base region of the separator may be as shown in the drawings of our British Patent No. 2082941.

The arrangement of the present invention is particularly suited to separators in which the upper level of liquid in the vessel is not defined by the lid. In devices in which the upper level of the liquid in the vessel is defined by a lid, the necessity for a flow modifying plate of the nature described herein may be avoided if the outlet duct is not in the normal circulating path of liquid flowing in the vessel 1.

I claim:

1. A separator for operation at low energy for separating solid components out of a liquid mixture, comprising a vessel having a cylindrical outer wall and a base at one end, the vessel being provided with (a) a body which defines with the base an annular opening which is spaced from the outer wall (b) an inlet, for introducing a liquid containing the solid components into the vessel, (c) means for promoting a rotational movement of liquid and suspended solids within the vessel, and (d) an outlet duct by which the liquid from which solids have been separated is removed from a central region of the vessel, wherein said outlet duct is positioned at an upper region of the vessel across the normal, direct annular path of circulating liquid in the vessel, wherein a flow modifying means is provided adjacent the outlet duct whereby circulating liquid in the vessel is caused to flow around said duct, away from its normal annular path, in a manner to reduce turbulence, and wherein said rotational movement promoted within the vessel is sufficient to cause or enhance an inward sweeping effect toward the annular opening on solids accumulated at the base of the vessel, whilst being of a sufficiently low energy that separation of the solids components in the liquid in the vessel is brought about primarily by gravity.

2. A low energy separator according to claim 1, wherein the vessel is an open vessel.

3. A low energy separator according to claim 1, wherein the outlet duct extends from a central cylindrical region of the vessel which is defined inward of an annular dip plate which is itself spaced inwardly of the outer wall of the vessel.

4. A low energy separator according to claim 1, wherein the duct is an enclosed pipe.

5. A low energy separator according to claim 1, wherein the duct is an open gully in the form of a spout leading from a slot in the dip plate.

6. A low energy separator according to claim 1, wherein the flow modifying means comprises a deflector plate which extends radially between the outer surface of the annular dip plate and the inside of the outer wall of the vessel thereby to guide liquid circulating in the upper region of the vessel to a lower level of the vessel whilst minimising turbulence.

7. A low energy separator according to claim 6, wherein the selector plate comprises a curved, smooth surface.

8. A low energy separator according to claim 7, wherein the curved, smooth surface is in the shape of one half of a venturi.

9. A low energy separator according to claim 1, wherein the outlet duct is shaped in such a way as to include the flow modifying means.

10. A low energy separator according to claim 1, wherein there is also provided a flow modifying means downstream of the outlet duct to bring the flow of liquid in the vessel to its normal level smoothly and without creating undue turbulence.

11. A low energy separator according to claim 1, wherein the means for promoting a rotational movement. of liquid and suspended solids within the vessel is &:he inlet to the vessel by which the liquid mixture is introduced into the vessel.

12. A low energy separator according to claim 11, wherein the inlet is tangential.

* * * * *